April 20, 1943.  H. S. DUNN  2,317,096
MOTION PICTURE CAMERA
Filed July 16, 1941
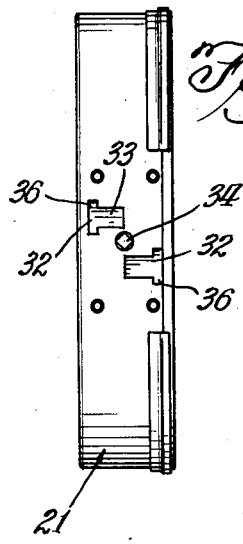
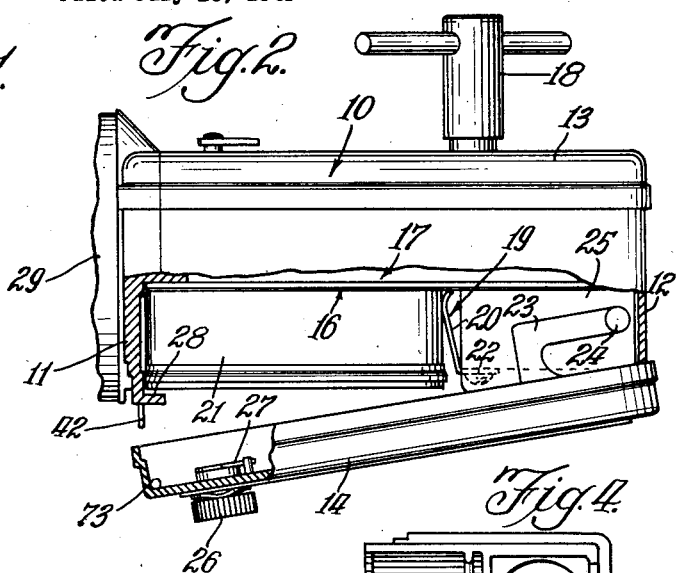
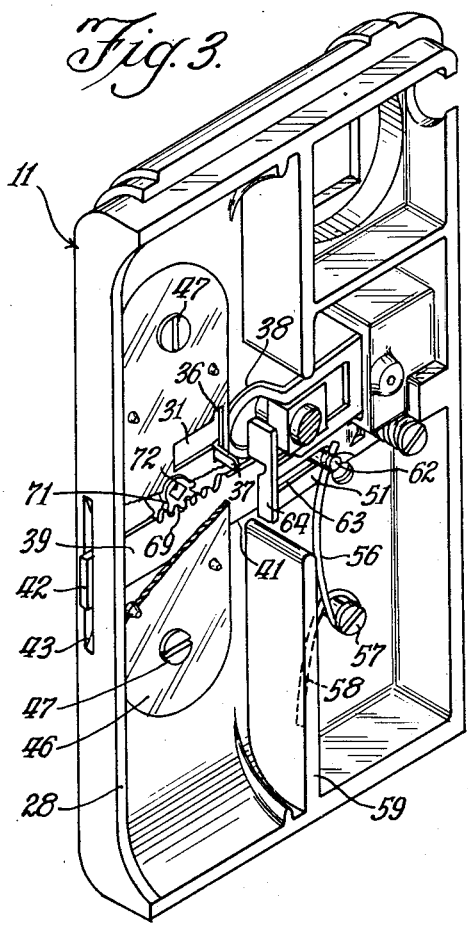
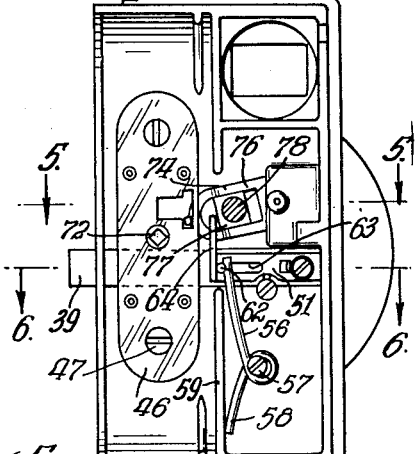
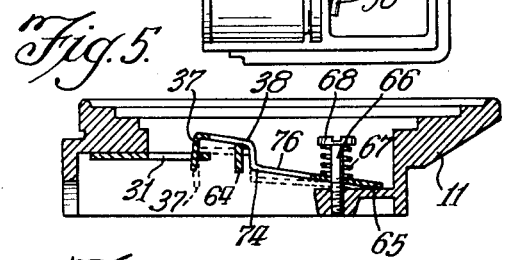
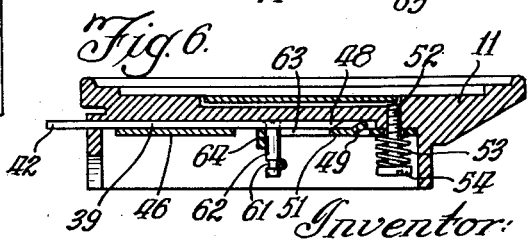
Inventor:
Henry S. Dunn
By Foorman L. Mueller Atty Patented Apr. 20, 1943

2,317,096

UNITED STATES PATENT OFFICE 2,317,096

MOTION PICTURE CAMERA

Henry S. Dunn, Chicago, Ill., assignor to Candid Camera Corporation of America, Chicago, Ill., a corporation of Illinois Application July 16, 1941, Serial No. 402,587

7 Claims. (Cl. 88—18.4)

This invention relates generally to photographic apparatus and in particular to improved means in a motion picture camera of magazine type for operating the film feeding means and magazine shutter moving means when the magazine is being changed.

One form of magazine usually provided in a motion picture camera of magazine type includes an exposure aperture and a shutter movable thereover. The aperture is generally of a form to provide for the operation therein of a claw member for advancing the film in the magazine across the aperture. In the loading of the camera, therefore, it is desirable that the magazine shutter be moved to an aperture-open position with the claw moved into the aperture without incurring any initial fogging of the film. Although various means have been provided in the prior art to accomplish this purpose, they have not been altogether satisfactory because of the inconvenience entailed in their operation.

It is an object of this invention, therefore, to provide an improved motion picture camera of magazine type.

Another object of this invention is to provide a motion picture camera of magazine type in which the magazine, on being changed, is automatically set for taking pictures concurrently with the moving of a cover for the magazine compartment toward a camera closing position.

A further object of this invention is to provide a motion picture camera of magazine type in which the magazine shutter and film feeding claw are moved to operating positions by means simple in design, compactly assembled in a minimum of space on a single frame member of the camera, and automatically and positively operated concurrently with the opening or closing of the cover for the magazine compartment.

Yet another object of this invention is to provide spring actuated means adapted to automatically move the magazine shutter moving and film feeding mechanism into and out of an operating position.

The principal feature of this invention is the provision of spring-pressed film feeding and magazine shutter moving mechanism which acts to simultaneously open the cover for the movie camera casing in which it is employed and itself move out of operating position. The mechanism is moved into operating position solely by pivotal movement of the camera casing cover from an open position to a closed position against the camera casing.

Further objects, features, and advantages of this invention will become apparent from the following description when taken in connection with the accompanying drawing in which:

Fig. 1 is a front view of a commercially available magazine for a motion picture camera;

Fig. 2 is a fragmentary end view partly in section of a motion picture camera showing the magazine in position in the magazine compartment with the door for the compartment in an open position;

Fig. 3 is a perspective view of a frame member of the camera showing the complete assembly of the invention thereon;

Fig. 4 is an elevational view of the assembly shown in Fig. 3 showing the parts thereof in changed positions;

Fig. 5 is a sectional view taken along the line 5—5 in Fig. 4; and

Fig. 6 is a sectional view as seen along the line 6—6 in Fig. 4.

In the practice of this invention there is provided a motion picture camera of magazine type having a frame member for carrying the usual objectives and having an opening therein for exposing the film in the film magazine. The frame member forms one wall of a magazine compartment, the film advancing and magazine shutter moving mechanism being mounted thereon within the compartment. The operation of this mechanism on changing of a magazine in the camera, is controlled by a spring-pressed plunger or operating member which is slidably supported in the frame member with one end projecting outwardly therefrom to engage a pivoted cover for the compartment. After the magazine is inserted into the compartment, the cover on being pivotally moved toward a closing position engages the projecting end of the plunger, which in turn moves the shutter moving and film advancing mechanism into operating position. A lock is provided solely to retain the cover closed. The plunger when the cover is unlocked automatically opens the compartment and moves the shutter moving and film advancing mechanism out of operating position.

Referring to the drawing, there is shown in Figs. 2 and 4 a motion picture camera having a housing or casing 10 including a front frame member 11, a back frame member 12, a top cover 13 and a pivoted bottom cover 14, the casing 10 being divided longitudinally by a partition plate 16 into a compartment 17 for receiving a spring motor (not shown), and a compartment 19 for receiving a film magazine 21, the motor having a winding key 18 projecting through the top cover 13. The magazine 21 is releasably retained in the compartment against the partition plate 16 and frame member 11 by a flat spring member 20 secured at one end 22 to a portion 25 of the camera structure which is located within the magazine compartment 19. The cover 14 for the magazine compartment has brackets 23 secured at one end thereto, with the opposite ends of the brackets being pivotally mounted as by axis members 24 on the camera structure 25. The cover or door 14 is held in a position for closing the compartment 19 by a locking member 26 rotatably supported on the cover and having a catch portion 27 engageable with an inwardly extending flange 28 integrally formed on the front frame member 11. The frame member 11 carries the usual objectives 29, with exposure of the film in the magazine 21 through the objectives being accomplished through a substantially T-shaped aperture 31 provided in the frame member 11 (Fig. 3).

As is shown in Fig. 1 the film magazine 21 has a pair of substantially T-shaped exposure apertures 32 therein which are normally covered by a shutter 33 located within the magazine casing and suitably rotatably supported thereon by an axis member having a square shaped portion 34 which projects outwardly from the film magazine. This film magazine is of a usual commercial type and is provided with a pair of winding rolls (not shown), an aperture 32 providing for the exposure of one-half of the film when the film is advanced in one direction, with the exposure of the other half of the film being made on turning the magazine 21 over within the compartment 19. The enlarged portion 36 in each aperture 32 is adapted to receive the claw 37 (Fig. 3) of a claw member 38 which functions to advance the film across an aperture in a manner well known in the art.

When the film magazine 21 in inserted within the camera compartment 19 one of the aperture 32 is arranged opposite the frame opening 31, the enlarged portion 36 being in a position to receive the claw 37 therein. The improved means for operating the shutter 33 and the film advancing means including the claw member 38, on changing of the magazine 21 in the camera (Figs. 3 and 4), includes a spring-pressed plunger or control member 39. The member 39 is slidably supported for linear movement in a groove 41 formed in and extending transversely of the frame member 11, one end 42 of the plunger being projected through an opening 43 provided in the flange 28 on the member 11. Retention of the plunger 39 within the groove 41 is accomplished by a retaining plate 46 mounted on the inner side of the frame member 11 by means of screws 47, with the opening 31 extending also through this plate. The other end 48 (Fig. 6) of the plunger or control member 39 is slidably engageable with a lug or bumped-out portion 49 formed on an actuating member or arm 51 for the claw member 38. The actuating member 51 is in a superposed relation with the plunger 39 and is pivotally supported at one end for pivotal movement toward and away from the plunger by a screw member 52 mounted on the frame member 11. A coil spring is arranged in compression between the actuating arm 51 and the head 54 of the screw 52 to normally urge the arm 51 against the plunger 39. It is evident therefore, that movement of the plunger 39 inwardly of the camera housing 10, or to the right as viewed in Fig. 6, pivotally moves the end portion 64 of the actuating arm 51 away from the plunger 39 against the pressure of the spring 53. When the plunger end 48 is moved out of engagement with the lug 49, as occurs when the plunger is moved toward the left as viewed in Fig. 6, the spring 53 returns the actuating member 51 to its position against the plunger 39. This return movement of the plunger 39 is accomplished by a loop spring 56 (Figs. 3 and 4) supported on a screw member 57 provided on the frame member 11, one end 58 of the spring being engageable with a flange or rib portion 59 on the member 11, and the opposite end being slidably engageable in an annular groove 61 formed on a pin 62 carried by the plunger 39. The pin 62 extends through a slot 63 formed in the actuating arm 51, this pin and slot connection retaining the actuating arm 51 superposed relative to the plunger 39 for all operating positions thereof.

The end or stop portion 64 of the arm 51 is integrally formed with the body portion of the arm and is at substantially right angles thereto for engaging the claw member 38. The claw member 38 is pivotally supported at its end 65 on a screw member 66 secured to the frame member 11, a coil spring 67 being arranged in compression between the end 65 of the claw member and the head 68 of the screw 66 (Fig. 5) to normally urge the claw end 37 through the aperture 31 and into an aperture 32 of the film magazine 21. From a consideration of Figs. 5 and 6, therefore, it is seen that the members 38 and 51 are pivotally movable in the same plane, which plane is substantially normal to the plane of the opening 31 and to the direction of linear movement of the plunger 39. By virtue of this construction the claw 37 is thus movable in a substantially linear direction directly into and out of an aperture 32 which is opposite the opening 31. The arm end 64 and claw end 37 are normally urged in opposite directions by their associated springs 53 and 67, respectively, so that these two ends are always in engagement. The pressure of the spring 53, however, is greater than the pressure of spring 67 so that the arm 51 is capable of moving the claw 37 in a direction outwardly from an aperture 32 for a purpose to be later noted.

The plunger 39 inwardly from the end 42 thereof, is provided on one side with a rack portion 69 for engaging a segmental pinion 71 rotatably supported on the frame member 11 between the retaining plate 46 and the inner wall of the member 11. The hub of the segmental pinion 71 is formed with a bore 72 of square cross section for receiving the square portion 34 on the axis for the magazine 33. It is evident, therefore, that with the axis portion 34 positioned within the bore 72 of the pinion 71, linear movement of the plunger 39 rotates the pinion 71 to in turn rotate the shutter 33 across an aperture 32.

In the operation of the present invention the film magazine 21 is positioned in the camera compartment 19 with the projection 34 in the bore 72 and an aperture 32 opposite the opening 31. With the magazine 21 thus positioned in the compartment 19, and the cover 14 in an open position, the shutter 33 is in a closing position relative to an exposure aperture 32 and the claw 37 is retracted away from such aperture, the relative positions of the claw member 38, the actuating arm 51 and the plunger 39 being shown in Figs. 4, 5, and 6. As the cover 14 is moved toward a position for closing the compartment 19 the plunger end 42 engages the inside of the cover 14 at a portion designated as 73, (Fig. 2) with the continued movement of the door after this engagement moving the plunger 39 inwardly of the camera. As the plunger 39 is moved in this direction the pinion 71 is rotated to in turn rotate the magazine shutter 33 to an aperture opening position, the engagement of the plunger end 48 with the lug portion 49 on the actuating arm 51 pivotally moving the stop portion 64 in a direction away from the claw member 38. Since the claw member 38 is normally urged against the stop portion 64 by the spring 67, this movement of the stop portion is followed by the claw member so that the claw 37 moves into the aperture 32 at the portion 36 thereof. The position of the claw member 38, when the claw 37 is inserted into the aperture 32, is indicated in dotted lines in Fig. 5. When the cover 14 is in its fully closed position the plunger 39 is in the position indicated in Fig. 3, the movement of the plunger to this position from its position shown in Fig. 4 being sufficient to completely open an aperture 32 and to provide for the movement of the claw 37 completely within such aperture and in an engaging position with the film in the magazine 21. The plunger 39 thus operates to move the magazine shutter 33 and film advancing claw 37 into operating positions concurrently with a pivotal moving of the cover 14 toward a closing position. The cover 14 is retained in its closed position by the lock 26.

The claw member 38 is formed with a substantially flat portion 74 (Figs. 3 and 4) having an elongated rectangular opening 76 therein for receiving a sliding block 77 which is eccentrically mounted on a shaft 78 driven by the spring motor. In the operation of the camera, therefore, the claw member 38 is oscillated about its pivot 67 to provide for a reciprocating movement of the claw 37 in the enlarged portion 36 of the aperture 32. The stop portion 64 is of a length to slidably engage the actuating member 38 for all positions thereof during the operation of the camera.

When the film magazine 21 is to be changed for a second exposure thereof, or a new magazine is to be inserted in the compartment 19, the lock 26 is released, the cover 14 being pivotally moved from its compartment closing position by the plunger 39 by virtue of the spring 56. The plunger 39 on movement thereof outwardly from the camera housing 10 rotates the shutter 33 in a reverse direction and into an aperture closing position, and disengages its end 48 from the lug portion 49 on the actuating member 51. Since the stop portion 64 is always in engagement with the claw member 38, the release of the actuating arm 51 by the plunger 39 permits the arm 51 to pivotally move the claw member 38 and retract the claw end 37 from the aperture 32, it being previously mentioned that the pressure of spring 53 is greater than the pressure of the spring 57. Thus the plunger 39 on unlocking of the cover 14 concurrently moves the cover out of its compartment closing position and provides for the movement of the shutter 33 and the claw 37 out of operating positions.

From a consideration of the above description and drawing, it is seen that the invention provides a motion picture camera of magazine type in which the magazine shutter moving and film advancing mechanism is automatically moved into and out of an operating position by means including a spring-pressed plunger, which is responsive in movement to the opening and closing of a cover for the magazine compartment. Since the shutter moving and film feeding mechanism is in an operating position only when the cover is closed, any possibility of operating the camera before the magazine is in an operating condition is entirely eliminated.

Although the above invention has been described with reference to a specific embodiment thereof, it is to be understood that it is not to be so limited since modifications and alterations therein can be made which are within the full intended scope of this invention as defined by the appended claims.

I claim:

1. In a camera including a casing with a compartment therein for receiving a film magazine having a shutter movable over an exposure aperture, and means for advancing the film in said magazine including a claw member for entering said magazine through said aperture, the combination with a movable cover for said compartment of a control means for said shutter and claw member including a spring-pressed plunger engageable with said cover, a movable arm having one end thereof operatively engageable with said claw member, and engageable with said plunger at the opposite end thereof, means retaining said claw member and movable arm under tension, means connecting said plunger and shutter, said cover on movement to a closed position engaging and moving said plunger to open said shutter and move said arm against the tension thereon to permit movement of said claw member into said aperture, and means for locking said cover in a closed position, with said cover on being unlocked being automatically opened by said plunger which moves to close said shutter and permit the one end of said arm to retract said claw member from said aperture.

2. In a camera having a magazine and a housing with a movable cover therefor, magazine shutter moving means, film feeding means including a claw member, spring means for moving said claw member within said magazine, means for operating said shutter moving means and claw member including a spring-pressed member connected with said shutter moving means and engageable with said cover, other spring means for retracting said claw member from said magazine associated with said plunger and claw member, with said cover on movement toward a closed position engaging and moving said spring-pressed member which in turn moves said magazine shutter moving means in one direction and acts on said other spring means to permit movement of said claw member by said first spring means, and said spring-pressed member when said cover is released automatically moving said cover toward an open position and moving said magazine shutter moving means in an opposite direction while permitting movement of said claw member by said other spring means.

3. In a camera having a housing and utilizing a film magazine, magazine shutter moving and film feeding mechanism within said housing, spring-pressed means operatively connected to said mechanism for moving the same into and out of operating position, and means on said housing engageable with said spring-pressed means and movable to a position for locking, said movable means on movement thereof in one direction toward said position for locking engaging and moving said spring-pressed means to move said mechanism into operating position, with said movable means on being unlocked being automatically moved in an opposite direction by said spring-pressed means, with said mechanism meanwhile being moved out of operating position.

4. In a camera including a casing for receiving a film magazine having a movable shutter, and film feeding means including a feeding claw the combination with a movable cover for said casing of an actuating member for operating said shutter and claw member, and engageable with said cover, spring means for moving said claw into said magazine to engage said film, other spring means for retracting said claw from said magazine, said actuating member being associated with one of said two spring means, means connecting said actuating member with said shutter, said cover on movement to a position for closing said casing engaging and moving said actuating member in one direction to open said shutter and permit movement of said claw member into said magazine by said first spring means, and means for automatically returning said actuating member in an opposite direction when said cover is released to close said shutter and permit said claw member to be retracted from said magazine by said other spring means.

5. In a camera utilizing a film magazine and having a housing with a movable cover, magazine shutter moving and film feeding mechanism within said housing and including a feeding claw, means for moving said mechanism into and out of operating position including a spring-pressed plunger operatively connected to said mechanism and arranged in the path of movement of said cover, and spring means acting on said feeding claw to alternately move the same in opposite directions in response to a reciprocating movement of said plunger, with said cover on movement toward a closing position moving said plunger to move said shutter moving mechanism into an operating position, and to permit said feeding claw to be moved in one direction by said spring means, and said plunger when said cover is released moving said shutter moving mechanism out of an operating position and permitting said feeding claw to be moved in an opposite direction by said spring means.

6. In a camera having a housing for receiving a film magazine including a shutter, a pivoted cover for said housing, film advancing means including a claw member movable into and out of said magazine to engage said film, means including a spring-pressed control member for moving said claw member and shutter to operating positions, said control member being arranged in the path of pivotal movement of said cover, means operatively connecting said shutter and control member, means retaining said claw member under tension to urge the same into said magazine, an actuating arm for said claw member engageable with said claw member to limit the movement thereof, means retaining said actuating arm under tension so that such tension acts to oppose the tension means of said claw member, means operatively engaging said control member with said actuating arm, said cover on pivotal movement toward a closed position engaging and moving said control member to open said shutter and move said actuating arm against the tension means therefor to permit said claw member to enter said magazine, and said control member when said cover is released automatically closing said shutter and permitting movement of said actuating arm to retract said claw member from said magazine.

7. In a camera utilizing a film magazine having a shutter and including a housing having a frame member, a movable cover for said housing, film feeding means including a member having a claw at one end, means pivotally supporting said claw member at the other end on said frame member, tension means at said pivot support for pivotally moving said claw into said magazine to engage said film, means for operating said shutter and claw member including a spring-pressed plunger slidably supported on said frame member and engageable with said cover, means connecting said shutter and plunger, an actuating arm for said claw member, means pivotally supporting said actuating arm at one end on said frame member, with the opposite end thereof being engageable with said claw member, other tension means at the pivot support of said actuating arm pivotally moving said arm to oppose the pivotal movement of the claw member by said first tension means, means engaging said plunger with said actuating member so that movement of said plunger in one direction pivotally moves said actuating member against said second tension means, said cover on movement toward a closing position engaging and moving said plunger in said one direction to close said shutter and pivotally move said actuating member to permit pivotal movement of said claw member into said magazine, and said plunger on release of said cover automatically moving in an opposite direction to move said cover toward an open position, meanwhile closing said shutter and permitting said actuating member to pivotally move said claw member out of said magazine.

HENRY S. DUNN.